(12) United States Patent
Schulze

(10) Patent No.: US 11,175,488 B2
(45) Date of Patent: Nov. 16, 2021

(54) MOBILE MICROSCOPE ASSEMBLY

(71) Applicant: Oculyze GmbH, Wildau (DE)

(72) Inventor: Katja Schulze, Berlin (DE)

(73) Assignee: OCULYZE GMBH, Wildau (DE)

( * ) Notice: Subject to any disclaimer, the term of this patent is extended or adjusted under 35 U.S.C. 154(b) by 112 days.

(21) Appl. No.: 16/076,097

(22) PCT Filed: Feb. 17, 2017

(86) PCT No.: PCT/EP2017/053634
§ 371 (c)(1),
(2) Date: Aug. 7, 2018

(87) PCT Pub. No.: WO2017/140854
PCT Pub. Date: Aug. 24, 2017

(65) Prior Publication Data
US 2020/0057288 A1   Feb. 20, 2020

(30) Foreign Application Priority Data

Feb. 18, 2016   (DE) .......................... 102016102867.3

(51) Int. Cl.
*G02B 21/00*   (2006.01)
*G02B 21/02*   (2006.01)
(Continued)

(52) U.S. Cl.
CPC ......... *G02B 21/0008* (2013.01); *G02B 21/02* (2013.01); *G02B 21/362* (2013.01);
(Continued)

(58) Field of Classification Search
None
See application file for complete search history.

(56) References Cited

U.S. PATENT DOCUMENTS 8,743,194 B2   6/2014  Fletcher et al.
2002/0044347 A1*  4/2002  Steenblik ............... G02B 21/26
                                                   359/368
(Continued)

FOREIGN PATENT DOCUMENTS

DE           692 27 355       3/1999
DE      10 2013 201 555       8/2013
(Continued)

OTHER PUBLICATIONS

Smith et al. "Cell-Phone-Based Platform for Biomedical Device Development and Education Applications" (Year: 2011).*
(Continued)

*Primary Examiner* — Mohammed Jebari
(74) *Attorney, Agent, or Firm* — Grüneberg and Myers PLLC

(57) ABSTRACT

A microscope assembly can be used during microbiological processes. The microscope assembly includes a lens assembly for magnified imaging of an object range in an imaging plane along an optical path; a sample receiving unit for a sample arranged in the object range; and a camera receiving unit for receiving a camera in a range of the imaging plane the camera adapted to generate a digital image of the sample; where the lens assembly is a ball lens, a halved ball lens, or a lens in the form of a rotational spheroid; and the camera receiving unit is adapted to receive a customary mobile end device equipped with a camera or a camera cooperating with a mobile end device.

18 Claims, 13 Drawing Sheets

(51) Int. Cl.
 G02B 21/36 (2006.01)
 G06K 9/00 (2006.01)
 G06T 5/00 (2006.01)
 H04N 5/225 (2006.01)
 H04N 5/232 (2006.01)
 H04M 1/02 (2006.01)
 G03B 17/56 (2021.01)

(52) U.S. Cl.
 CPC ....... *G06K 9/0014* (2013.01); *G06K 9/00147* (2013.01); *G06T 5/006* (2013.01); *H04N 5/2253* (2013.01); *H04N 5/23229* (2013.01); *G02B 21/361* (2013.01); *G03B 17/565* (2013.01); *G06T 2207/10056* (2013.01); *H04M 1/0264* (2013.01)

(56) References Cited

U.S. PATENT DOCUMENTS

| | | | |
|---|---|---|---|
| 2005/0063049 | A1 | 3/2005 | Steenblik et al. |
| 2009/0093274 | A1 | 4/2009 | Yamamoto |
| 2014/0120563 | A1* | 5/2014 | Ozcan ................ G01N 21/274 435/7.94 |
| 2014/0243685 | A1 | 8/2014 | Patwardhan et al. |
| 2014/0368816 | A1* | 12/2014 | Prakash ................ G01N 21/01 356/244 |
| 2015/0005032 | A1 | 1/2015 | Fletcher et al. |
| 2015/0029120 | A1 | 1/2015 | Sieckmann |
| 2015/0036043 | A1 | 2/2015 | Markovic et al. |
| 2015/0037786 | A1 | 2/2015 | Salsman |
| 2015/0054935 | A1 | 2/2015 | Muramatsu |
| 2015/0138374 | A1 | 5/2015 | Ito et al. |
| 2015/0304555 | A1 | 10/2015 | Ehrenkranz |
| 2016/0004057 | A1* | 1/2016 | Lin .................... G02B 21/0008 359/363 |
| 2016/0070092 | A1* | 3/2016 | Ozcan ................ G02B 21/0008 348/79 |
| 2016/0147057 | A1 | 5/2016 | Nagayama et al. |
| 2016/0290916 | A1* | 10/2016 | Ben Shoshan ..... G01N 15/1463 |
| 2017/0227756 | A1* | 8/2017 | Lin ........................ G02B 21/26 |

FOREIGN PATENT DOCUMENTS

| | | |
|---|---|---|
| DE | 10 2013 112 508 | 2/2015 |
| DE | 10 2014 007 704 | 11/2015 |
| DE | 10 2015 105 293 | 11/2015 |
| EP | 0 547 232 | 6/1993 |
| JP | 2015-206857 | 11/2015 |
| WO | 2009/088930 | 7/2009 |
| WO | 2011/156249 | 12/2011 |
| WO | 2012/058641 | 5/2012 |
| WO | 2013/120091 | 8/2013 |
| WO | 2013/191665 | 12/2013 |
| WO | 2015/022996 | 2/2015 |
| WO | 2015/087232 | 6/2015 |
| WO | WO-2019103909 A1 * | 5/2019 ............. G02B 21/26 |

OTHER PUBLICATIONS

Oncescu et al. "Smartphone based health accessory for colorimetric detection of biomarkers in sweat and saliva," Lab On a Chip, vol. 13, No. 16, 2013, pp. 3232-3238 XP055145187.
International Search Report mailed in PCT/EP2017/053634 dated May 2, 2017, with English translation.
Written Opinion of the International Searching Authority mailed in PCT/EP2017/053634 dated May 2, 2017.

* cited by examiner 88  86  87

92  94  96  98

MOBILE MICROSCOPE ASSEMBLY

This application is a National Stage entry under § 371 of International Application No. PCT/EP2017/053634, filed on Feb. 17, 2017, and claims priority to German Patent Application No. 10 2016 102 867.3, filed on Feb. 18, 2016.

TECHNICAL FIELD

The invention relates to a microscope assembly comprising (a) a lens assembly for magnified imaging of an object range in an imaging plane; (b) a sample receiving unit for a sample arranged in the object range; and (c) a camera receiving unit for a camera arranged in the range of the imaging plane of the lens assembly for generating a digital image.

A lens assembly may be understood as a single lens but also as an assembly of several lenses. In the case of microscopes, an image of the object range is generated in an imaging plane, which is magnified several times with the lens assembly. When a sample is inserted into the object range, the sample is enlarged imaged in an imaging plane of the lens assembly. Known microscopes have an ocular for this purpose, which can be used to view the image by the human eye. However, there are also known microscopes which provide a camera in the imaging plane. The magnified image is recorded by the camera and can then be viewed and processed on a computer screen, or the like.

PRIOR ART

Microbiological processes are regularly checked and monitored during commercial applications. An example for such a microbiological process is the yeast and the contamination analysis in the brewing process. Samples are taken for checking and microscopically analyzed. The observations must be evaluated and recorded. This is carried out either manually or by means of appropriate software and hardware. When the sample is extracted and transferred to a laboratory, there is a risk of the sample being altered by time delay and changing ambient conditions. On-site inspection is complicated, since sensitive microscopes, analyzing instruments and computers in the production need to be protected from damage, overheating, contamination and the like and they require space.

Microscopes usually include various objective lenses, which constitute expensive multiple lens systems, respectively. The user chooses the magnification according to available objective lenses. Viewing occurs through an ocular. Known Microscope assemblies must, therefore, satisfy demands on ergonomics, which consequently have a specific size. Known microscopes are usually not designed for automatic processing of the analytical findings.

It is known to connect a digital camera to a microscope by means of an interface. The data is then processed by a common personal computer. Experiment conditions are not recorded. The analysis and processing of the analytical results usually requires a high level of expertise.

WO 2011 156 249 A2 describes a method for measuring the cell number and viability of yeast cells in a sample. DE 692 27 355 T2 describes a portable magnification viewing device for body segments. WO2012058641A2 discloses the recording of images of skin surface and body openings, by means of a smartphone and a microscope attachment. An object plate or a sample chamber is not provided. WO2013120091A1 discloses an assembly with single lenses. Disclosed is a variation of the Leeuwenhoek microscope, which is folded out of paper and was designed for manual application.

US 2009/0093274 A1 discloses a magnifying assembly for the application with a mobile phone to enhance the device's fun levels and to establish further use possibilities. The magnification provides at least two lenses along the optical path: one objective lens and one collecting lens. Additionally, the use of a field lens and an aperture is disclosed. Such a lens assembly is a complex structure and is comparatively expensive to manufacture. The magnifications achieved with this assembly are not sufficient for microbiological applications, such as the examination of yeasts.

US 2015/0037786 A1 discloses a portable diagnostic system with a sample carrier and an analysis module. The analysis module comprises a microscope with small dimensions in the range of chips with its own camera and an optics that allows for several 100-fold magnification. The analysis module comprises an electronic circuit with storages and communication interfaces. Furthermore, suitable input-output components are provided for the input and output of data. The data recorded with the diagnostic system can be conveyed to a mobile end device, or the like. The latter or a computer for enhanced analysis connected through a network carry out an image analysis which is not disclosed in detail.

DE 10 2013 112 508 A1 discloses an adapter for mounting of a mobile end device with a camera to a microscope assembly. The microscope assembly is conventional, has a complex structure and is expensive.

DISCLOSURE OF THE INVENTION

It is an object of the invention to provide a device of the above mentioned kind, which is small, inexpensive, has a simple design and can be used mobile on-site and, at the same time, allows for high-quality processing and logging.

According to the invention this object is achieved in that
(d) the lens assembly is formed by a ball lens, a halved ball lens or a lens in the form of a rotational spheroid; and
(e) the camera receiving unit is adapted to receive a customary mobile end device equipped with a camera or a camera cooperating with a mobile end device.

A particularly inexpensive, compact and portable microscope assembly is achieved with such an assembly. In particular, the lens can be a lens with a diameter of under 5 mm, preferably under 2 mm. A strong curvature with large magnification is hereby achieved. A particularly preferred embodiment of the invention uses a ball lens with a diameter of 1 mm. Alternatively, an even smaller lens with a diameter of 0.5 mm may also be used. In particular, the detector plane of the camera is adapted to be fixed in the imaging plane or slightly behind it.

Using a simple arrangement, a high degree of magnification is achieved with this type of lens assembly. The recorded image is transmitted from the mobile end device to a central data processor. This is advantageous in that regardless of the performance capacity of the mobile end device, large computing and storage capacities can be used. This central data processing system can be set up at an entirely different location. It is not influenced by the local production process. Notably, the central data processing system can employ complex software used by a great number of users. This way, investment costs are low. The software, in particular, can serve to automate processing steps. The user then needs a correspondingly lower level of expertise than if he or she carries out the processing on-site by him- or herself. The user then promptly obtains the desired result and does not need to manually process the sample. The use of a central data processing system further enables correction of blurred edge ranges of the images. Such blurred edge ranges are very pronounced for ball lenses and comparable lenses with small diameter. Since the cause of the blur is well defined and the same for all images, it is easily corrected with a suitable software.

In a particularly simple modification of the invention, the camera receiving unit is formed by a slot adapted to receive a smartphone or another flat mobile end device. The mobile end device is equipped with its own camera. Examples of such mobile end devices with cameras are smartphones and tablet computers. The camera is positioned directly underneath the lens assembly. The slot thereby serves as a lead so that no complicated alignment is necessary. Preferably, adjustment means for adjusting the camera position are provided. Then, the slot can be adapted to the dimensions of the mobile end device or the position of the camera. An adjustment does not need to be performed for every image of the same camera, but only upon changing the camera. Accordingly, it is possible to record the images without much effort.

In a further modification of the invention, the sample receiving unit constitutes a slot or a cavity for an object plate or a sample chamber. The object plate or the sample chamber, for example a glass or plastic sheet, is inserted into the slot or introduced into the cavity. The object plate or the sample chamber with the sample is then positioned without any further adjustments.

In a particularly preferred modification of the invention, a flexible and/or deformable material is provided on the bottom part of the sample receiving unit, into which the sample, or an object plate or sample chamber equipped with the sample can be pressed. A stamp may be used for applying the pressure to the object plate or the sample chamber. The stamp may apply pressure to the object plate or the sample chamber outside of the sample and so move the sample in the direction of the optical axis into the focus of the lens assembly. Alternatively, adjustment means are provided for adjusting the position of the ball lens.

In a particularly convenient modification of the invention, means are provided for detecting the presence of a camera and/or a mobile end device. Such a tool could be a Near-Field-Communication Sender (NFC-Sender), which, for example, detects a RFID tag in the mobile end device and activates a software installed there for confirmation of the camera.

Preferably, it is provided that a coded sample carrier for the sample is provided and that the mobile end device has means for recognizing and processing the coding. Additional information can then be deposited on the sample carrier or at the sample chamber, which is automatically collected by the image.

Furthermore, a lens exchanger may be provided with multiple lenses with different characteristics and which are moveable to replace the lens in the optical path. Thereby, in particular, the magnification, or the size of the detected sample section can be varied.

In an advantageous modification of the invention, it is provided that the sample is provided on an object plate or in a sample chamber which has a curved profile, wherein the curvature is selected such that aberrations are at least partially corrected. In a modification of the invention, a further optical path in which a lens is arranged is provided, whereby a further range of the sample is detected. This way, multiple sample ranges may be simultaneously detected and processed.

The object of the invention is further achieved by a method for recording and processing an image of a sample, magnified with a microscope using a lens assembly, comprising the steps:
(a) recording an image of a sample magnified by a microscope with a digital camera:
(b) transferring the recorded image to a central data processing system by means of a mobile end device, wherein a plurality of images from various microscopes are processed by said central central data processing system; and
(c) storing and processing the digital images in the central data processing system; wherein
(d) the image of the sample is magnified with a ball lens, a halved ball lens or a lens in the form of a rotational spheroid and the image shows ranges with aberrations;
(e) the digital, recorded image is processed in order to at least partly correct aberrations;
(f) the corrected image is processed in the central data processing system whereby a result is received; and
(g) the result of the processing is transferred back to the mobile end device.

In particular, it can be provided that the camera is integrated into the mobile end device and that the mobile end device is fixed for the recording in a defined position relative to the microscope. Such fixing may be effected, for example, by means of a slot into which the mobile end device is inserted as far as it will go. The slot serves as a lead so that lateral shifting is avoided. However, it is also possible to use a fixing of a different kind, such as with clasps or the like.

Preferably, the transfer to the central data processing system is effected at least partially by means of the internet. Thereby, it can be provided, in particular, that the transfer over a first section from the camera to the mobile end device is effected by means of a cable or a Bluetooth connection. It is also possible, to transfer the data directly by means of a telephone connection without using the internet. The transfer may be encrypted or unencrypted.

In a preferred modification of the invention, it is provided that the color, shape and/or texture and/or further features of the sample or of the sample components are detected for the processing of the image and a classification of the sample or of the sample components is carried out according to the type and strength of the features. In particular, individual sample components in the sample can be identified and marked in a resulting image. Examples of features are the diameter, area, roundness, average brightness of pixels and the average HUE-value (color) of a sample component. An example for a sample component is, for example, yeast.

In a particularly preferred modification of the invention, further information is transferred to the central data processing system along with the recorded image, which is manually inserted, was saved beforehand or is detected and supplied to the mobile end device by means of suitable sensors. Data, which is available anyway in the mobile end device, can also be transferred. Such data is, for example, the date, time and location of the recording or an identification code of the mobile end device. The data which is manually inserted can, in particular, include the circumstances of the sample collection, for instance, batch numbers or abbreviations of the people who took the sample.

In a particularly preferred modification of the invention, the result involves the transfer back to the mobile end device of a processed image of the sample after processing. An image which was magnified with a ball lens, for example, is blurred at the edge ranges. During processing, these edge ranges are cut out, the brightness of the image is corrected and detected sample components (objects) are marked. This image provides an overview of the quality of the sample and of the image to the user and lets him or her check if the recognition worked properly.

Modifications of the invention are subject matter of the subclaims. An embodiment is described below in greater detail with reference to the accompanying drawings.

DESCRIPTION OF THE EMBODIMENTS

1. Embodiment (FIGS. 1 to 4) Recording with a Smartphone

Figure 1:
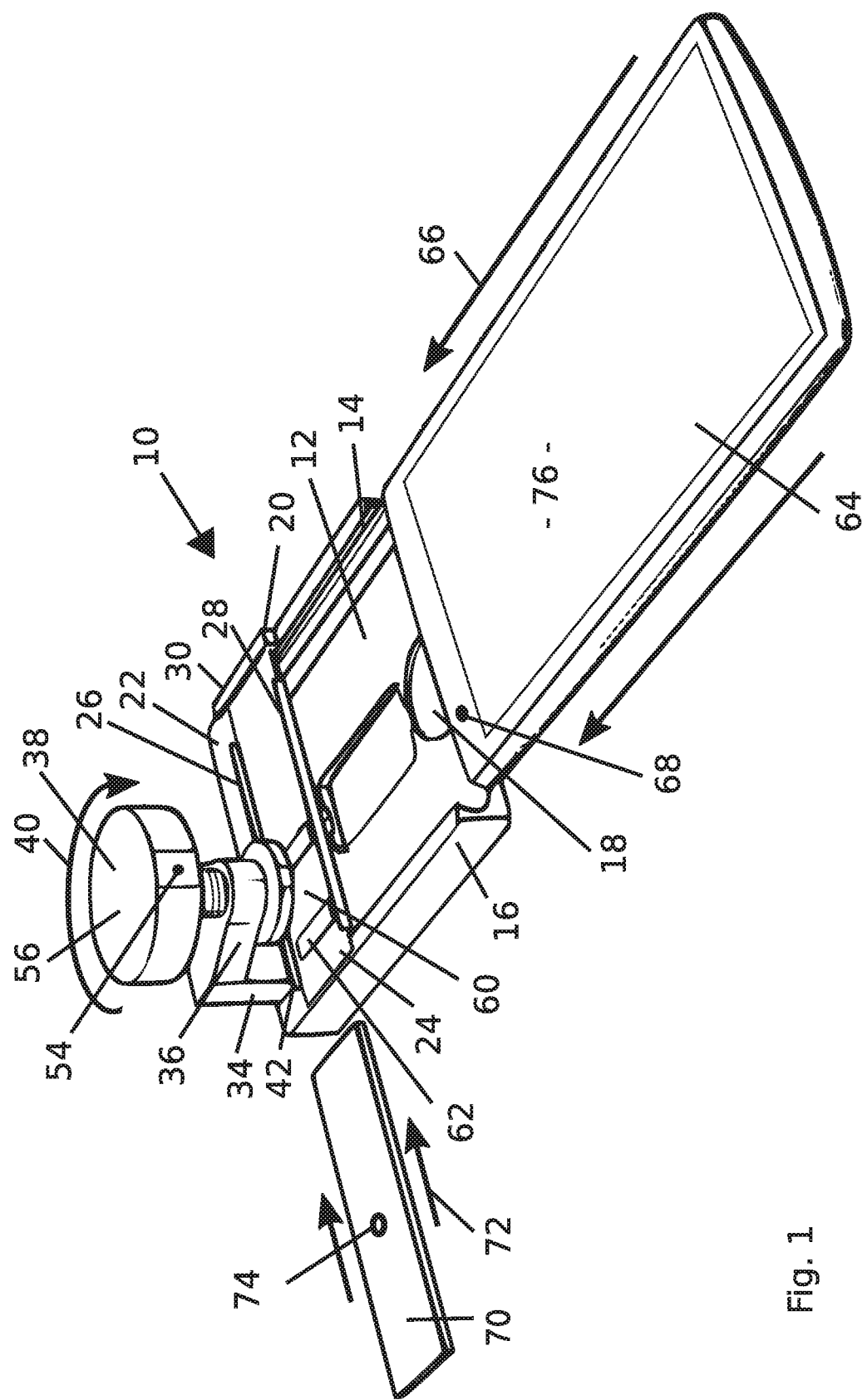
FIG. 1 is a perspective representation of a mobile microscope assembly with a sample carrier and a smartphone before insertion.

FIG. 1 shows a microscope attachment generally designated with numeral 10. In the present embodiment the microscope attachment consists of plastic material. An alternative embodiment uses a microscope attachment made of metal, in particular, stainless steel. The microscope attachment 10 has a flat slot 12 with rail-shaped side walls 14 and 16. A depression 18 is provided in the bottom part of the slot 12. In the depression 18 there is an NFC tag (not shown). The upper side of the slot 12 is open. The rear area of the slot 12 in FIG. 1 is closed and forms a stop with a rear wall 22.

A bracket 20 is mounted on the upper side of the slot 12. However, it is also possible to produce the bracket 20 as a separate component and then fasten or weld it thereto with suitable glue or fastening elements. The bracket 20 sits on the side walls 14 and 16 at the rear end of the slot 12. It has a planar, rectangular base plate 24 with side walls 26 and 28 at the longitudinal sides of the base plate 24. The opposite side is limited by a stop 30.

A side plate is mounted on the bracket 20 as a backward extension of the base plate 24. This can be seen in FIG. 3. A stop cuboid 34 is screwed onto the side plate 32 with a screw 35 which extends through the rear wall 22 and the side plate 32 from below. The stop cuboid 34 extends upward in FIG. 1 and has a projection 36 protruding over the base plate 24. The projection 36 is provided with a bore hole with an internal thread. This can be seen in the cross section in FIG. 3.

A rotatable knob 38 is screwed into the internal thread. This is illustrated by an arrow 40 in FIG. 1. The rotatable knob 38 is essentially hollow. This can be clearly seen in the exploded representation in FIG. 3. A lower part 44 of the rotatable knob 38 generates a stamp with a planar underside 42. This part 44 is screwed into the bore hole in the projection 36 from below. An upper part 46 of the rotatable knob 38 is attached to the lower part 44 protruding from the projection 36.

An LED 48 is arranged in the interior space of the lower part 44 of the rotatable knob. The contacts 50 of the LED are lead upward into the upper part 46. The LED is supplied with energy by means of an exchangeable battery or an accumulator 52. The LED can be turned on with an on/off switch 54. It is understood that any other light source which is inexpensive and small may also be used at this place. In an alternative embodiment which is not shown, the electronics is also arranged on a circuit board. In this case, a push button may also be used instead of a switch and additional features, such as a status light or an automatic shutdown mode, may be added.

The battery 52 is arranged in the upper, broadened part of the hollow rotatable knob 38. This part is closed with a detachable cap 56. An outside knurling at the broadened part of the rotatable knob 38 alleviates the rotation about small angles.

A bore hole is provided in the center of the base plate 24 underneath the rotatable knob 38. In the bore hole there is a ball lens 60 with a diameter of approximately 1 mm. In an alternative embodiment, a ball lens 60 with a diameter of approximately 0.5 mm is arranged. The ball lens 60 is made of glass. In a different embodiment, the ball lens 60 has a diameter of 2 mm. The ball lens 60 is jammed into the bore hole. However, it is also possible to glue the ball lens 60 therein. Using a ball lens 60 with a diameter of approximately 1 mm, a magnification of 400× can be achieved. Smaller diameters cause an even greater magnification. Thereby, the focus of the lens lies only slightly underneath the lens surface.

Elastic foam strips 62 are attached to the base plate 24 laterally next to the ball lens 60 more or less underneath the stamp 42. These can be clearly seen in FIG. 1. The assembly works as follows:

A commercial smartphone 64, as it is typically sold by Apple, Samsung, HTC and the like, is inserted into the slot 12 toward the arrows 66 up to the stop. The smartphone 64 has a so-called front camera, here designated with the numeral 68. In the present embodiment, a smartphone 64 was chosen which exactly matches the diameters of the slot 12 and microscope attachment 10. In an alternative embodiment, not shown, the stop and the width of the slot 12 are adjustable so that virtually any smartphone can be inserted into the right position. It is also possible to use an adapter with which the diameters of the smartphone and the position of the camera can be adjusted to fit into the slot. The smartphone is then inserted into the slot with the adapter.

The insertion of the smartphone 64 is detected by the NFC tag in the depression 18. The tag sends a signal to the activated smartphone 64 which start a suitable software application. It is understood that the application can also be started manually. Once the smartphone 64 has been inserted up to the stop 22, the camera 68 lies directly in the optical path of the LED 48 underneath the ball lens 60. The distance between the camera 68 and the ball lens 60 is thereby only a few mm.

A sample carrier 70 with a sample 74 is pushed from the open side in the direction of the arrows 72 (FIG. 1) maximal to the stop on the base plate 24. The side walls 26 and 28 thereby serve as the lead. The sample carrier 70 is inserted up to a point where the sample lies in the area between the LED and the ball lens 60 in its inserted state. When the camera 68 is activated, the position of the sample can be checked on the clearly visible display 76 of the smartphone 64. The sample 74 is in the right position if the sample components are clearly visible.

Figure 2:
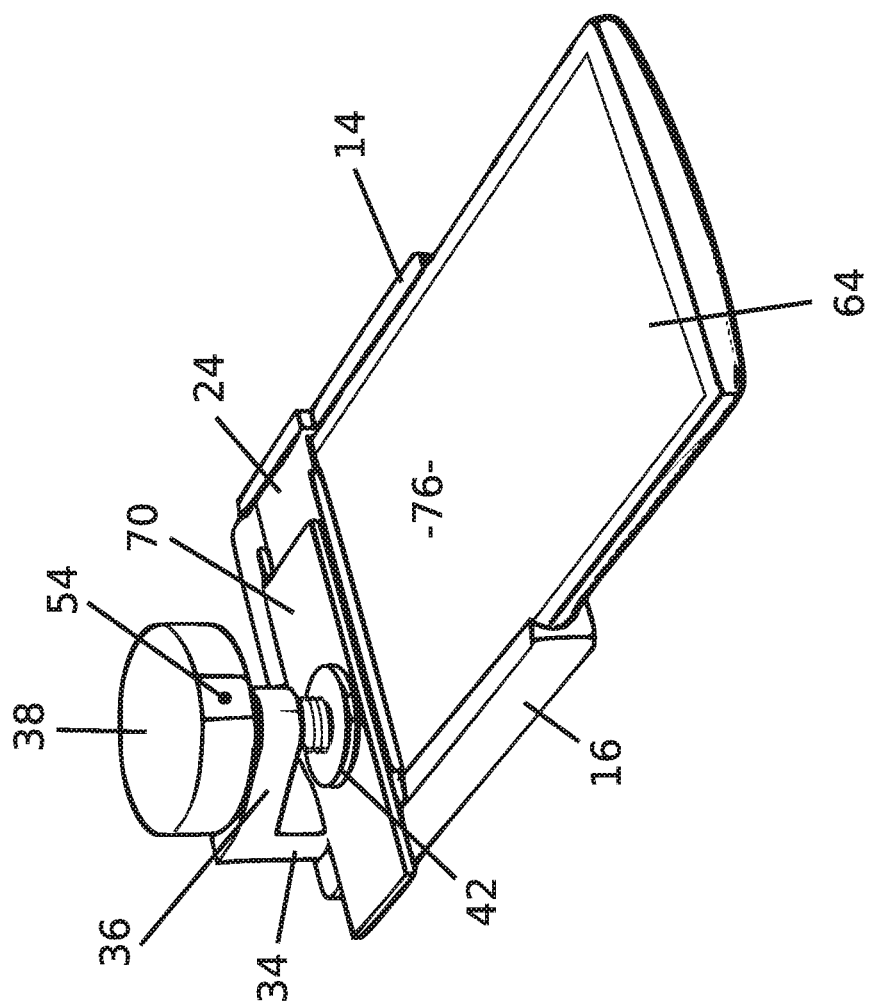
FIG. 2 shows the assembly of FIG. 1 in operating mode while recording.
Figure 3:
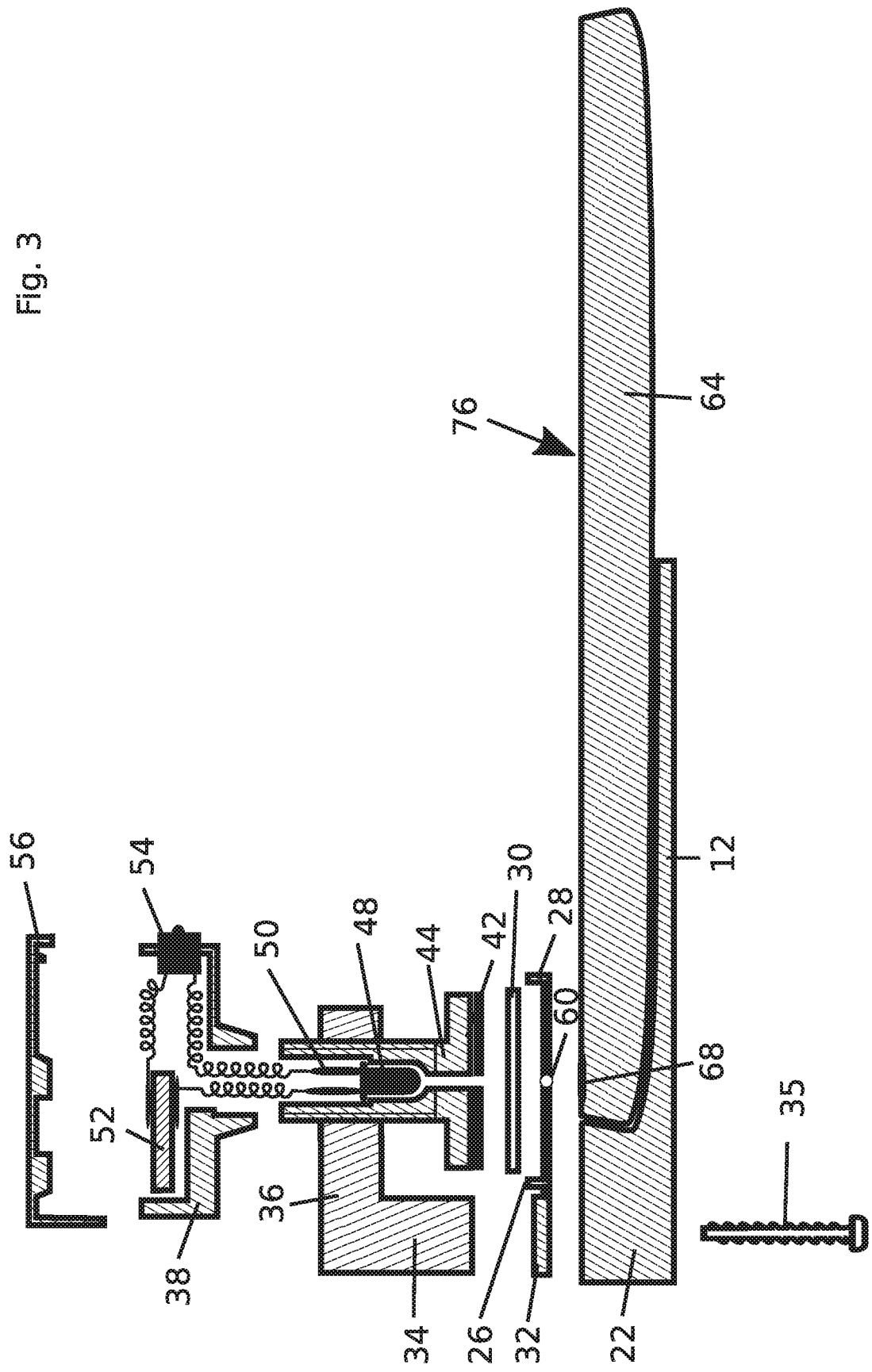
FIG. 3 is a cross section through the assembly of FIG. 2.

FIG. 2 shows the assembly 10 with an inserted smartphone 64 and an object carrier or a sample chamber 70 on the base plate 24.

Figure 4:
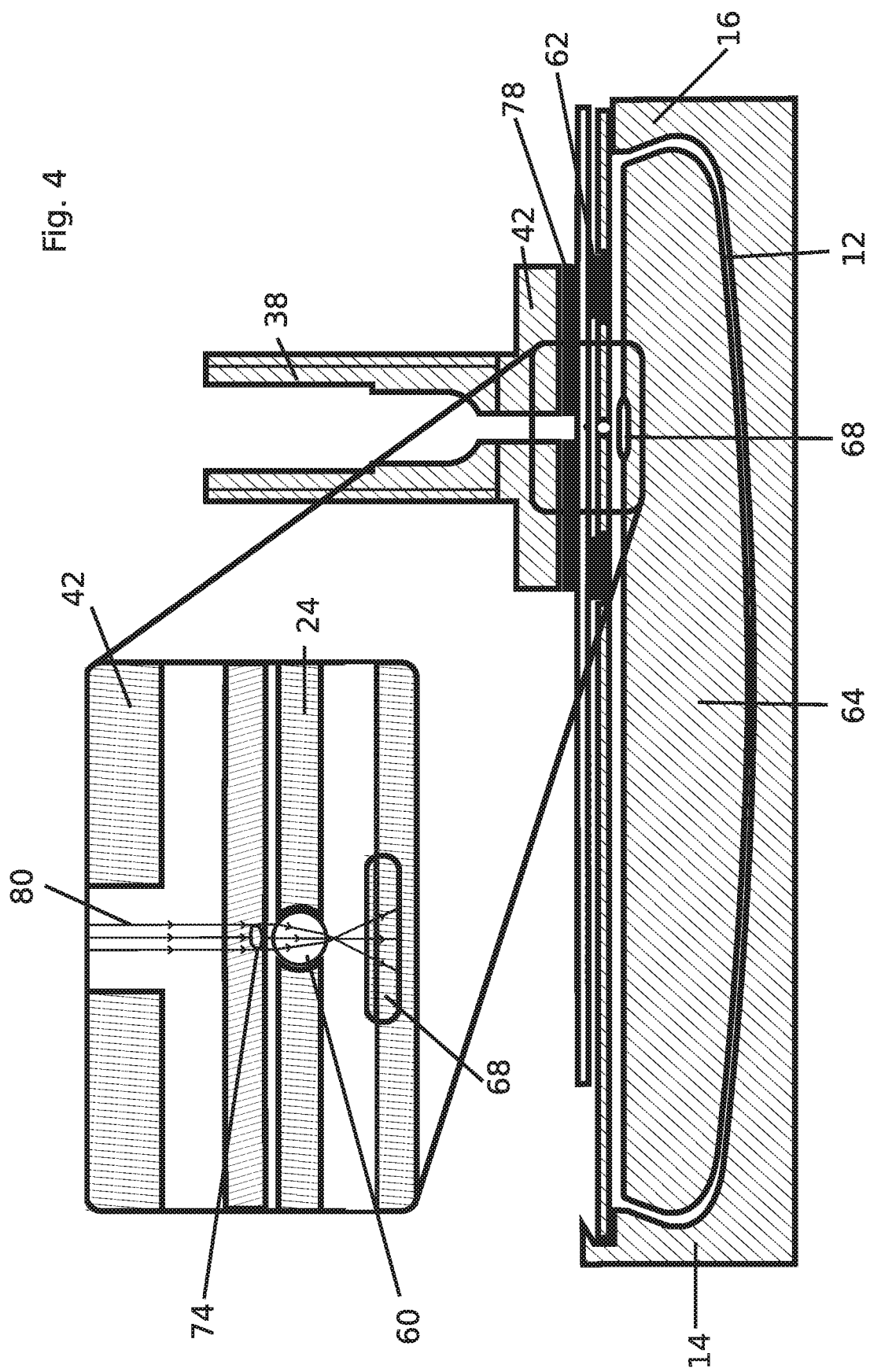
FIG. 4 illustrates, in detail, the optical path through a ball lens in the assembly of FIG. 1.

FIG. 4 shows a section 78 with a ball lens 60 and a sample 74 in an enlarged representation. The sample 74 sticks to the lower surface of the sample carrier facing the lens. Thereby, it is achieved, that the distance from the sample 74 to the lens 60 is particularly small corresponding to the big lens curvature. The light 80 from the LED coming from above illuminates the sample 74. The ball lens 60 images the image of the sample on the camera 68 with a magnification of about 400×. One can clearly see, that the structure of the assembly allows for positioning of the sample and the camera in close proximity to the ball lens 60. Accordingly, a very high imaging quality is achieved despite the small dimensions.

The small distances usually require readjusting. For this purpose, the sample carrier 70 is pressed into the soft strips 62 with the stamp 42. To that end, the stamp 42 is turned downwards. A slight rotation is enough for readjustment. Thus, fixation of the object carrier or the sample chamber 70 as well as the adjustment is carried out with the stamp 42.

The image created with the camera 68 is viewed on the display 76 until the adjustment is sufficiently sharp. Then, an image 82 is recorded.

2. Embodiment (FIG. 8): Sample Chamber

Figure 8:
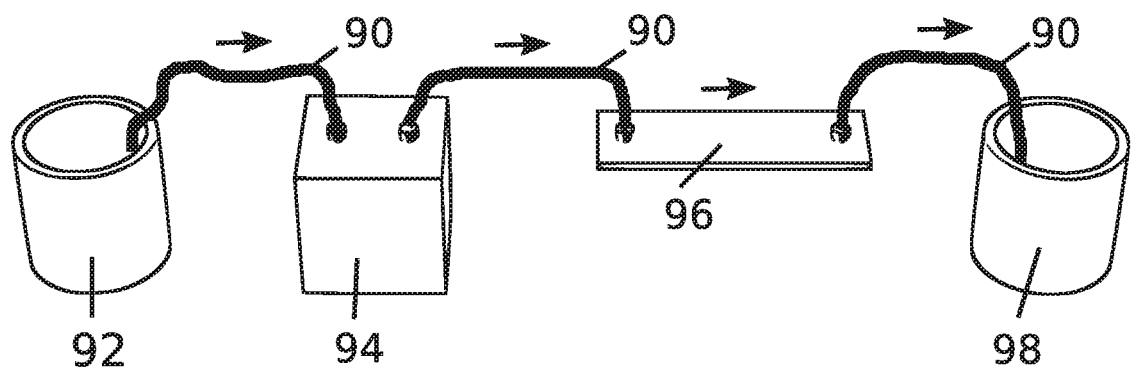
FIG. 8 shows an alternative embodiment of the assembly of FIG. 1.

Depending on the application, it may be wise to use a flow through sample chamber, as it is illustrated in FIG. 8. FIG. 8 is a schematic drawing which is meant to show that the sample chamber can also be used with a flow through system. Instead of filling the sample chamber once in order to record images, a flow through the chamber can be used in order to monitor a process continuously. In doing so, images or videos are taken by a software periodically, which are used for processing. FIG. 8 shows tubes 90, sample carriers 92, a pump 94, a sample chamber 96 and receiving containers 98.

3. Embodiment (FIG. 11): Recording with an External Camera

Instead of a slot or a slide-in module into which a smartphone is inserted, an assembly with an external camera can be used. A section from such an assembly is shown in FIG. 11.

Figure 11:
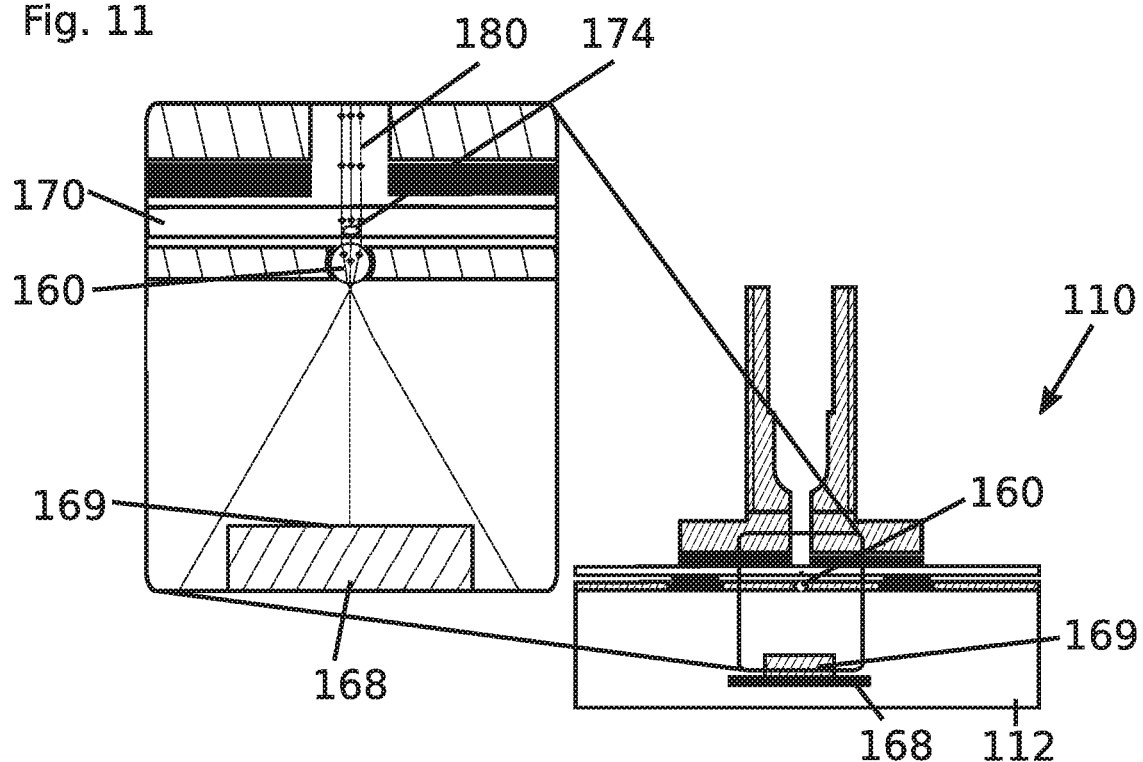
FIG. 11 is a cross section through an alternative embodiment of a mobile microscope assembly with a sample carrier in a transmission light assembly, where an external camera for recording and a smartphone for data transmission are used.

FIG. 11 is a cross section through a microscope assembly 110 with an external camera 168 in a housing 112. The camera 168 has a sensor with a sensor surface 169. Unlike a camera 68 in a smartphone 64, the sensor has no further imaging optics and allows for a larger image area. The sensor can, therefore, be arranged with the sensor surface slightly apart from a ball lens 160 also used here.

As in the first embodiment, a sample 174 is illuminated on a sample carrier 170 with light 180 from an LED or from a different suitable light source. The light 180 emerges through the sample in the transmitted light procedure and is pooled with the ball lens 160. The image of the sample 174 hits the sensor surface 169. As in the first embodiment, focusing can take place with the help of a stamp. The visual check is carried out with a smartphone (not shown), which is connected by means of a USB-interface and a cable or a different suitable—also wireless—interface with the camera 168. The image is transferred to the smartphone and is continued to be used there as described below. The advantage of an external camera is that an arbitrary mobile end device, for example a larger tablet or the like, can be used. The application is not limited to smartphones anymore that fit into the slot.

4. Embodiment (FIG. 12): Recording of Fluorescence Light

Figure 12:
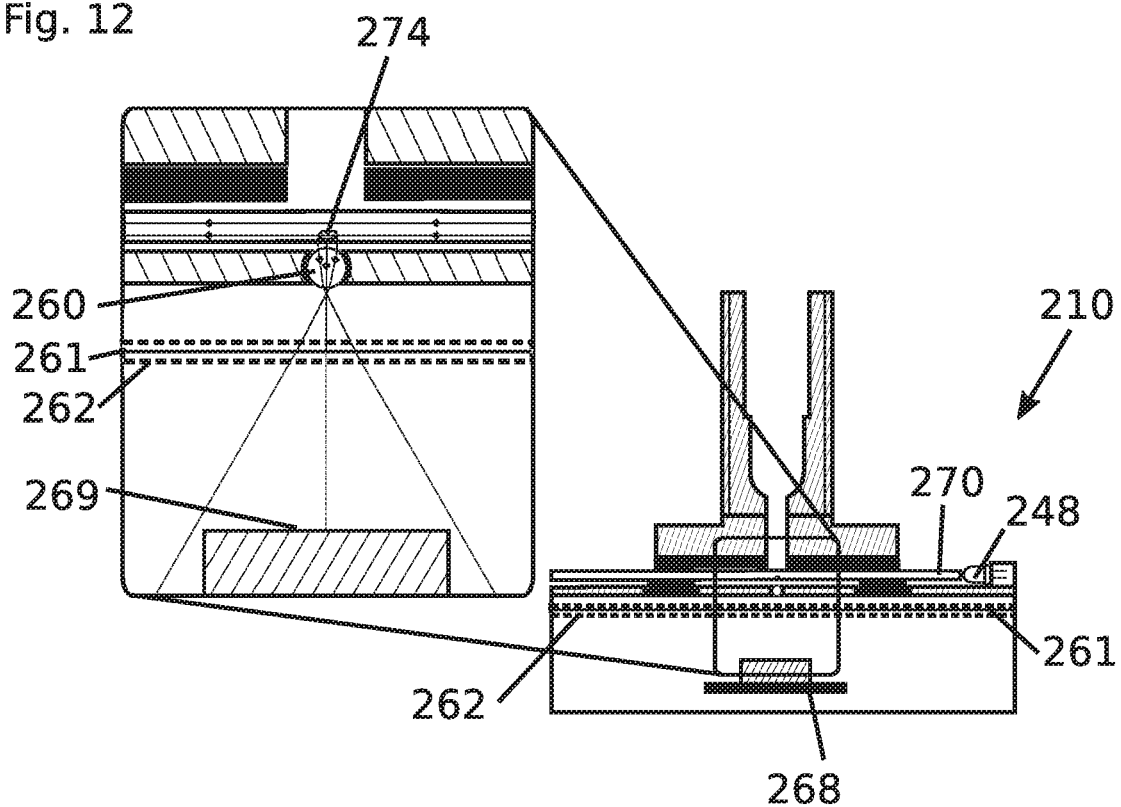
FIG. 12 is an alternative embodiment, similar to FIG. 1, where the fluorescence of a sample is recorded.

A section of a microscope assembly 210 with an external camera 268 is shown in FIG. 12. The microscope assembly 210 with a ball lens 260 essentially corresponds to the microscope assembly 110 of the third embodiment, which is shown in FIG. 11. However, in this assemble the sample 274 is not illuminated from above, but by an LED 248 which couples the light into the sample carrier/chamber. For this purpose, the LED is arranged sideways in FIG. 11 at the level of the sample carrier 270. The LED 248 emits light at a defined wavelength. The sample is excited to fluorescence with the light of the LED 248. The emitted light also radiates downwards towards the sensor 268. An optical filter 261 is arranged in the optical path in front of the sensor surface 269 of the sensor 268. The filter 261 is located in a slot 262 and can be exchanged or removed as required.

5. Embodiment (FIG. 13): Profiled Sample Carrier

Figure 13:
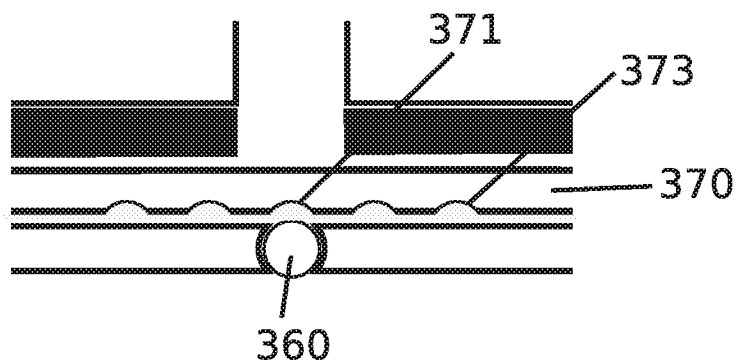
FIG. 13 shows a sample carrier which is curved in the range of the lens.

In order to achieve a high resolution, all embodiments use a ball lens 360 with a strong curvature. The hereby resulting aberrations are the same in all recorded images and can be wholly or partially corrected. Instead, or in addition to this, the present embodiment uses a profiled sample carrier 370 or a profiled sample chamber with an curved sample plate 371. The shape of the curvature is choses in such a way, that optical errors of the ball lens 360 are mostly corrected. The base area of the curved sample chamber 371 is shaped so that the whole image section appears as a sharp image. The application of several curves 373, as shown in FIG. 13, enabled the sharp display of multiple image sections.

6. Embodiment (FIG. 14): Coded Sample Carrier

Figure 14:
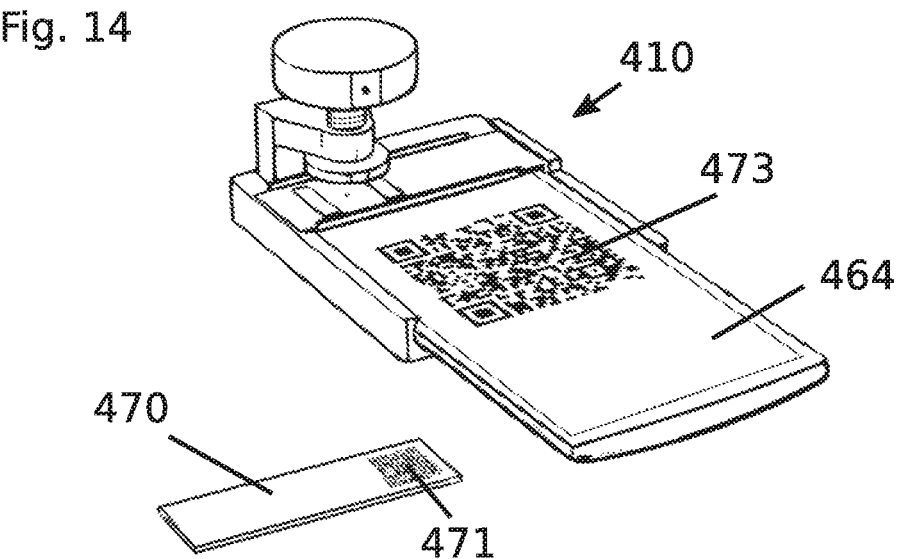
FIG. 14 illustrates the use of coded sample carriers.

FIG. 14 shows an embodiment, in which a coded sample carrier 470 is used for an assembly 410 which corresponds to one of the embodiments described here. The present embodiment shows an assembly 410 in FIG. 14, in which a smartphone 464 is inserted into the slot of the assembly. An OR-code is used as coding. However, it is clear that a barcode or any other machine-readable code it suitable. A recording of the OR-code 471 can be made by means of the back camera of the smartphone 464. This is then displayed as a code 473 on the display of the smartphone 464. A not-shown opening in the assembly 410 allows for use of the back camera without removal from the assembly 410. By reading the OR-code 471 with help of the back camera and an application running on the smartphone, data and information about the sample chamber and/or the sample can be acquired. This information includes the chamber type, the field of application, the chamber height, contained reagents in the chamber, for example staining solution and/or calibrating data for the measurement. For example, when applying sample chambers with various volumes, the concentration calculations can be adjusted. The user does not need to enter the data manually.

7. Embodiment (FIG. 15): Lens Exchanger

Figure 15:
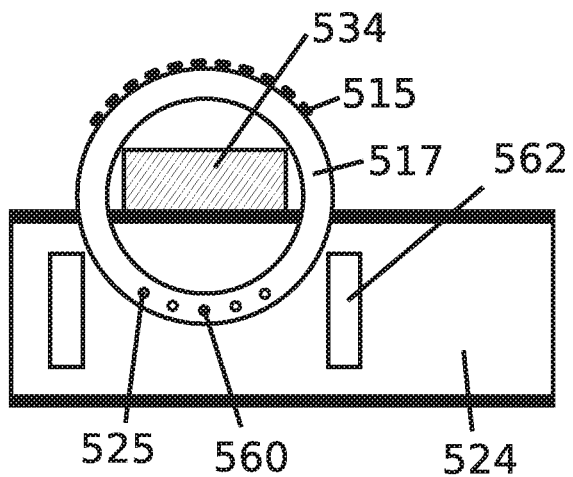
FIG. 15 shows a lens exchanger for an assembly according to FIG. 1, 11 or 12.

FIG. 15 shows an embodiment which offers the possibility of measuring the measurement with various ball lenses. This is especially useful, when different applications require different magnifications. Apart from that, the assembly is practically identical to the other embodiments described here.

A moveable component 517 is integrated in FIG. 15. It is located around the stop cuboid 534. Lenses, which vary in their size or other properties, are located at different positions. The lens 560 is positioned in the optical path. As in a conventional microscope, a different optic, for example 525, can be slid in to the optical path by turning of the component 517 and the object can be viewed at a different magnification. With recordings of lower magnification, a larger image section can be detected and processed. The elastic pads 562 are positioned in such a way, that they are fixed to the left and right of the moveable component 517 on the base plate 524. A gripping area 515 on the back side of the moveable component 517 allows for easy manual moving. Instead of the revolver displayed in FIG. 15, the part in which the lens is located, can also be exchanged.

8. Embodiment (FIG. 16 to FIG. 18): Recording with Two Optical Paths

Figure 16:
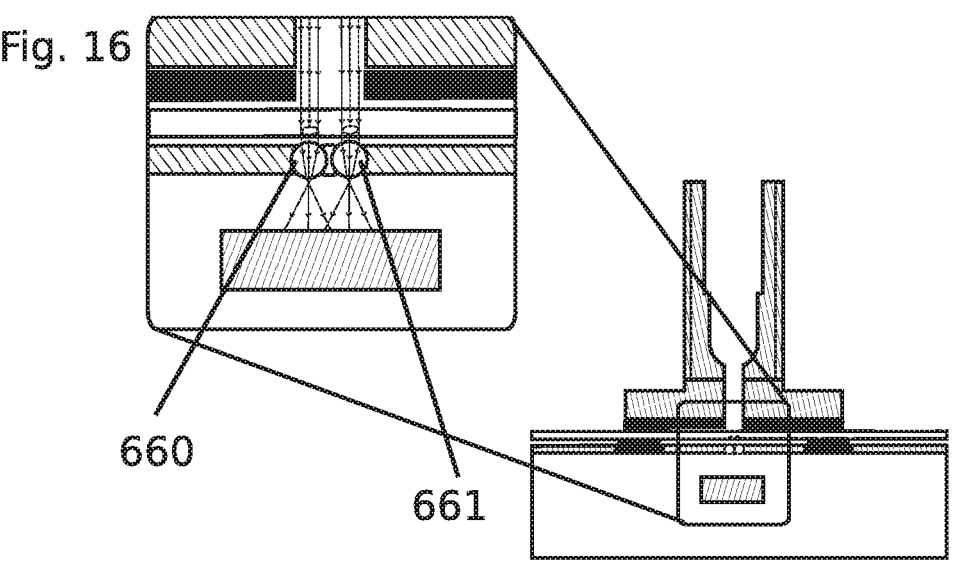
FIG. 16 is a cross section through an assembly similar to FIG. 11 but with two optical paths each with their own lens.
Figure 17:
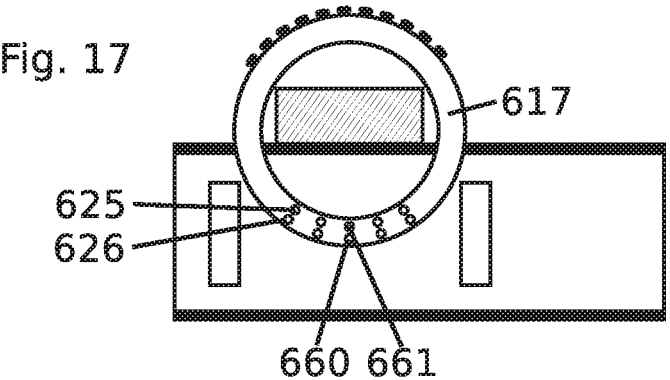
FIG. 17 shows a lens exchanger for an assembly of FIG. 16.
Figure 18:
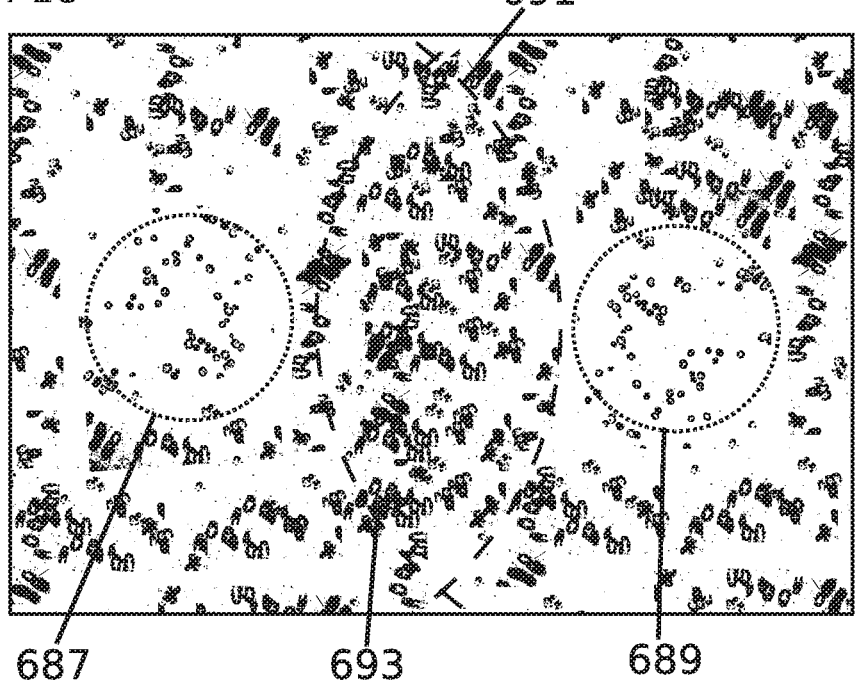
FIG. 18 is a recording which was recorded with two lenses with the assembly according to FIG. 16.

An assembly is shown in FIGS. 16 to 18, which, essentially, corresponds to the embodiments described here. One can see in FIG. 16, that in contrast to the comparable embodiment in FIG. 11, not only one optical path is provided with a lens 660 for recording of an image of the sample, but there are two optical paths with two lenses 660 and 661. The lenses 660 and 661 display various fields of vision 687 and 689 on one or more sensors. Thus, several sample areas of the sample are detected simultaneously, which one can clearly see in FIG. 18. FIG. 18 shows the image created by two lenses 660 and 661 at the same time, which create an image on a common sensor. The two areas 687 and 689, which are circled with dotted lines, are those areas, which are displayed in sharp focus under the respective lens. These areas are used for the further processing, as described below. Depending on the distance between the lenses, the areas on the image which are out of focus may overlap on the sensor. This is indicated by wide-spaced divided circles 691 and 693 in FIG. 18, between the areas 687 and 689. In this area, a higher density of displayed cells can be seen which are out of focus. When the lenses are further apart from each other, no overlap of the blurred areas occurs. When an individual sensor is used for each lens, a separate image for each lens is obtained.

The application of two lenses arranged side by side can be considered with a lens exchanger, as it can be clearly seen in FIG. 17. For this purpose, the lenses 660 and 661 can be simultaneously positioned with the revolver in the optical path. By turning the component 617, other optics, for example 625 and 626, can be slid into the optical path. It is clear, that not only two but also multiple, for example 4 lenses with 4 optical paths can be provided. All embodiments described above are suitable for recording samples in a sample chamber or a sample carrier and for processing as described below.

Processing of the Images

Figure 6:
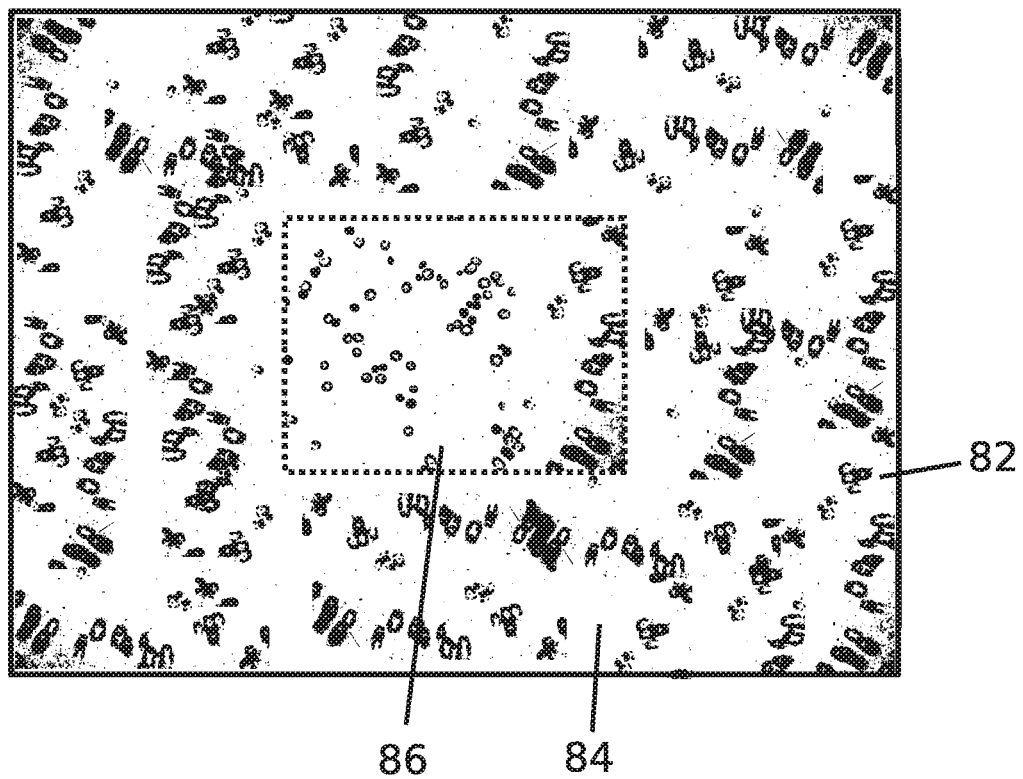
FIG. 6 shows the raw data of an image with yeast recorded with the assembly of FIG. 1.
Figure 7:
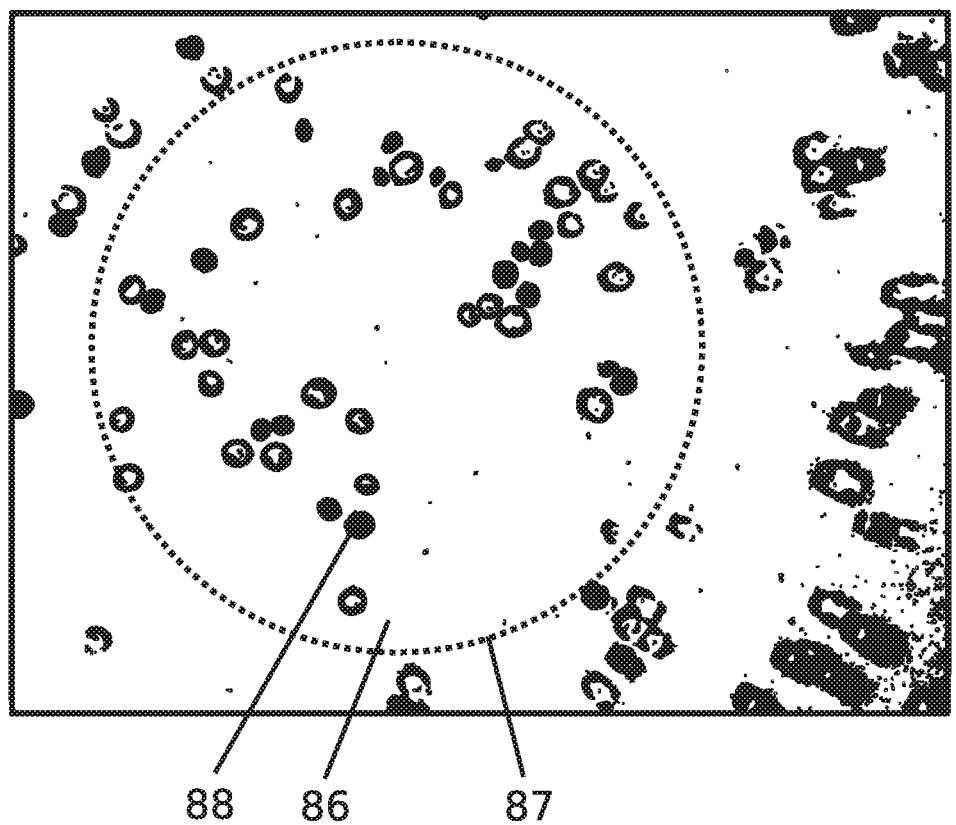
FIG. 7 shows a section of the image of FIG. 6 used for the analysis.

A first application for a recorded image 82 is yeast in a brewing process. The image is displayed in FIG. 6. One can see that the edge area 84 shown is rather blurred. The center area 86, on the other hand, is recorded with a high image quality. A magnified view of this is shown in FIG. 7. In order to enable an optimal analysis, the clearest round area 87 shown is automatically determined by the software application. The blurred areas outside of the area 87 are made useful for the analysis by an additional pre-processing step.

The entire process of the analysis with one of the assemblies described above is illustrated in FIG. 5, by means of a progression chart. Initially, preparatory steps I are taken at the hardware for the analysis. Preparatory steps include inserting the smartphone 64 into the slot and fixing and adjusting of the sample with the sample carrier 70. Inserting of the smartphone 64 is detected and a software application 185 is initiated. Alternatively, the software application 185 is automatically initiated.

In step II, one or more recordings are performed. The recorded images can optionally be saved with the help of the software application 185 or stored temporarily. The images are processed with the software application, so that the area in focus is detected and aberrations can at least partially be corrected: optionally this step can be fully or partially conducted upon receiving by the web server 97 in step III. Then they are sent to a web server 97, i.e. a central data processing system with a processor, a storage, data connections to at least one network and a server program, by means of a network, for example the internet or a telephone network. The images are received by the web server 97 in step III. This is illustrated by an arrow 181. If several images are recorded, for example N images, this step is performed multiple times, respectively, i.e. separately for every image. This is illustrated by an arrow 187.

Every image received by the web server 97 is initially stored as raw data in the data base 189 in step IV. This is illustrated by an arrow 191.

After the images have been recorded, further details and information on the experiment can be entered in step X with the help of the software application 185. The server 97 also receives these experiment details by means of the internet or a different network and they are incorporated in step XI into the data base by saving the details. This is illustrated by an arrow 195. Furthermore, the data can be stored in the data base 189. This is illustrated by an arrow 197.

The web server 97 activates a further software 199 for image processing. The objects 88, i.e. individual sample components in the image, are separated from the background in step V and registered separately. Various characteristics are calculated for each object in step VI. These describe the color, shape & texture. By means of the calculated characteristics, a present classifier can differentiate the objects into corresponding classes in step VII. The classified objects are marked in a resulting image in step VIII. Additional data, such as total number, number of objects in the classes and characteristics of individual objects, are stored as metadata in the data base 189.

For the corresponding image, in step XII a response is sent to the software application 185 on the smartphone 64, which ends the processing. This is illustrated by an arrow 101. The software application 185 downloads the resulting image and the metadata created in step VIII for the corresponding image. By doing so, it is checked by means of the data base program, how many images have already been processed for the existing experiment. As soon as all images are processed, the results are displayed on-site on the smartphone 64, in step XIV.

Figure 10:
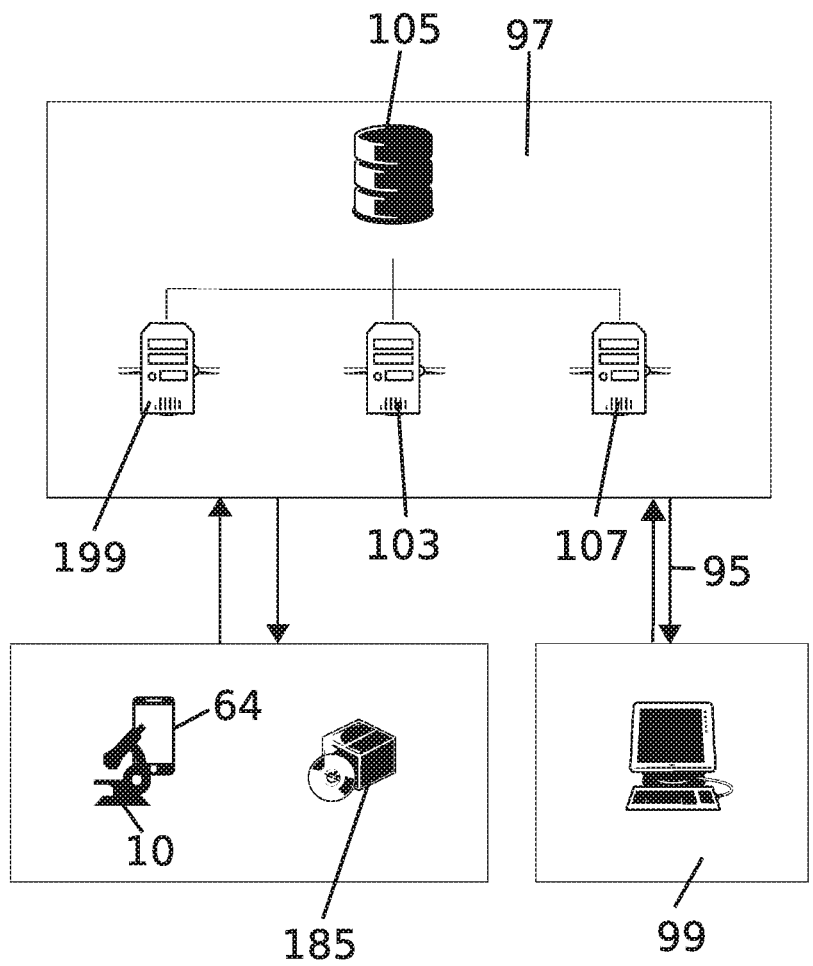
FIG. 10 illustrates the interaction of the components of a system for the recording and processing of images of a sample.

The hardware components of the assembly are outlined once again clearly in FIG. 10. The mobile part of the assembly provides the microscope assembly 10, as already described, and a smartphone 64 with the application 185. The server 97 includes, besides a processor, the usual means for data transfer and storage 105, the program 199 for image processing and the data base program for the data base 189. In addition to this, a server program for web service and meta analyses 103 and a program with a billing system 107 is provided on the server 97. The individual functions of the server can be carried out on computers separated physically or by means of virtualization. The data can be transferred to an internet-ready device, for example a desktop PC 99. This is illustrated by an arrow 95. There, they are available for further use and processing of individual data.

Figure 9:
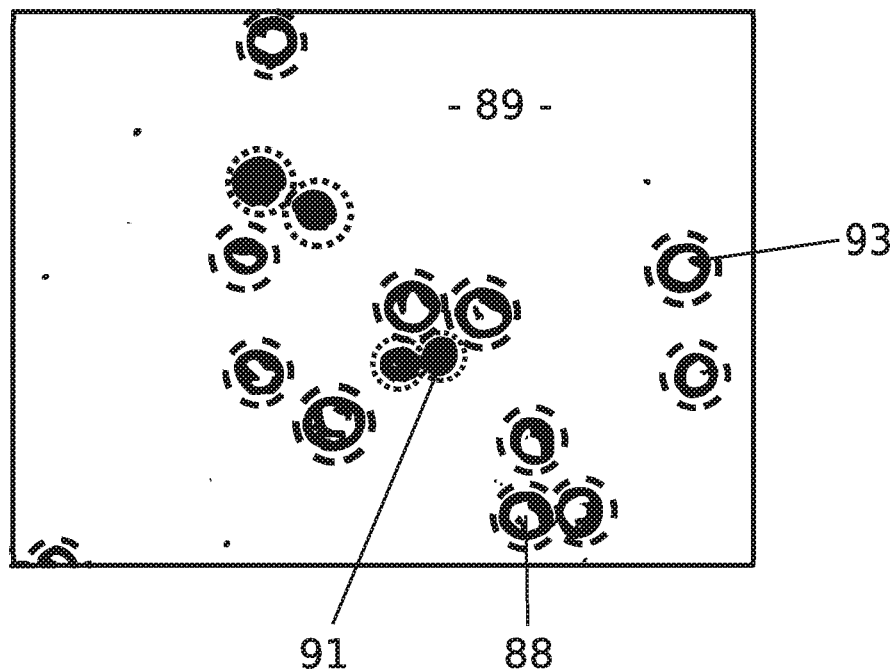
FIG. 9 shows sections of the processed data of the image of FIG. 7.

The system transmits the image of the microscopic recording, exemplary shown in FIG. 7, to the server 97 which processes the image by means of, among others, the image detection software 199. The results are promptly passed on to the user by means of the internet or a different network. An example of a section of such a processed image is shown in FIG. 9. The background 89 is neutrally displayed. The individual objects 88 are clearly visible. The desired objects are now marked and counted with the image detection software 199. In the present embodiment, the objects 91 which are consistently circular and colored black, for example, can be easily distinguished from the remaining objects 93. The black cells, recognized as dead, are marked with a dotted circle and the light cells, recognized as living, are marked with a dashed circle.

The recorded raw data is processed with two programs: firstly, a processing is carried out and, where appropriate, correcting of image sharpness, for example by way of steps:

1. Test for an excessive number of cells in the image, in proportion to the number of edges which are determined by means of a Sobel-Operator (for example, Sobel, I., & Feldmann, G. (1968). A 3×3 isotropic gradient operator for image processing, a talk at the Stanford Artificial Project in, 271-272.)
2. Test for sufficient sharpness of the image over the variance of a discrete Laplace operator of the shares in the image, which were registered as edges in step 1.
3. Localization of the focus point of the lens in the image by segmenting the image and determining the variance of a discrete Laplace operator (for example E. Davies (1990). Machine Vision: Theory, Algorithms and Practicalities, Academic Press, pp 131-134.)
4. Correction of blur in the lens edge area by means of a Barrel Distortion Correction (for example Gribbon, K. T., Johnson, C. T., & Bailey, D. G. (2003. Nov.). A real-time FPGA implementation of a barrel distortion correction algorithm with bilinear interpolation. In image and Vision Computing New Zealand (pp. 408-413).)
5. Cropping of the image area 87 used for the actual analysis by way of the center point determined before and a defined size of the useable image area.

These steps are independent of the image content. The actual image processing of the image content is illustrated by means of the example "Yeast" and can, for example, comprise the following steps:

1. Color correction by shifting of the median of the individual color channels to a fixed value
2. Normalization of brightness (for example Rafael C. Gonzalez, Richard Eugene Woods (2007). Digital Image Processing. Prentice Hall. P. 85.)
3. Separation into image foreground and background by computing the adaptive threshold value (for example according to E. Davies (1990). Machine Vision: Theory, Algorithms and Practicalities, Academic Press, pp 98-96.)
4. Cell isolation by way of a watershed process (for example according to S. Beucher. C. Lantuejoul (1979). Use of Watersheds in Contour Detection In International Workshop on Image Processing: Real-time Edge and Motion Detection/Estimation, Rennes, France.)
5. Calculation of features of individual cells, for example, size according to the number of pixels that constitute a single cell or color histograms for the RGB-data of the image area of a cell
6. Cell recognition and cell differentiation by way of multilayer perzeptrones, which were trained by Backpropagation (for example according to Paul Werbos (1974). *Beyond regression: New tools for prediction and analysis in the behavioral sciences*. PhD thesis, Harvard University. and Rumelhart, D. E., Hinton, G. E., & McClelland, J. L. (1986). A general framework for parallel distributed processing. In D. E. Rumelhart, J. L. McClelland, & the PDP Research Group, parallel distributed processing: Explorations in the microstructure of cognition. Volume 1: Foundations (pp. 45-76). Cambridge, Mass.:MIT Press.)

It is clear that the image processing and image treatment can also be performed in a different way, in particular when the image content is different.

Figure 5:
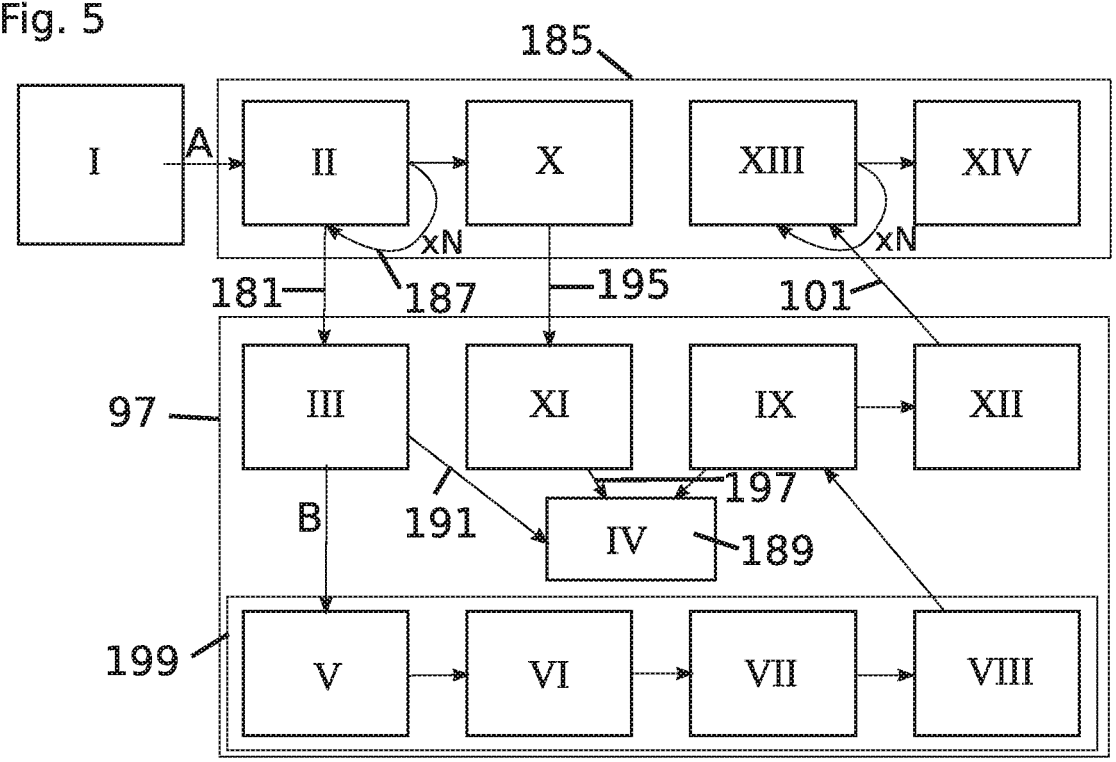
FIG. 5 is a flow chart with the steps for analyzing samples with the microscope of FIGS. 1 to 4.

The system stores the results of the analysis centrally and online, as described by means of FIG. 5, so that they can be called up again at a later time. FIG. 10 illustrates the components of the entire system. It is understood, that the central data processor 97, in the form of a server backend, can cooperate with a great number of mobile end devices 64 and that the access of data can occur from a plurality of desktop PCs 99 or comparable devices. The arrows 95 in FIG. 10 represent the transmission paths, for example, by means of a telephone and/or an internet connection.

Applications

The assemblies described above, and the processing described by means of yeasts, can also be used for different applications. The magnification, the type of sample chamber, the number of used lenses, the mode of recording—transmitted light or fluorescence—and the choice of camera—integrated or external camera—can thereby be adjusted to the requirements of the application in an appropriate way. Exemplarily, several applications are described here. It is clear that the assembly and the method can be extended to further applications without deviating from the underlying idea.

The system is particularly interesting for yeast analysis in small and medium-sized companies, but also for those whose way to the central laboratory is too long for an exact measurement. Furthermore, the assembly and the method allow meta analyses. Meta analyses are about processing results from various individual analyses as a whole, for example, studying the questions of how the cell number and viability change in the course of the brewing process. This can be approximately shown as a graph. It can also be investigated, whether the yeast in this brewing process, behaves as it usually does at this point. Where the behavior deviates, a warning can be generated when the behavior is suddenly worse for example. Finally, the brewing processes in a specific tank can be significantly worse/different, statistically speaking, to others, if that particular customer has several thereof. This can also be investigated.

The assembly and method are practically suitable for any microscopic processing, including the monitoring of yeast-run fermentation in the production of beer and beer-like drinks. The yeast analysis is primarily about determining, after coloring, the number of viable and non-viable cells by means of their color and, by doing so, calculating a concentration and a percentage share. Additionally, for example, the age of the cells can be determined by means of the diameter. That is information which can be used as a quality assurance or for monitoring the brewing process. The yeast-run fermentation can be monitored in the case of wine from honey, fruit and vegetables, sparkling wine, kefir, soy sauce and ethanol.

The assembly and method are further suitable for the computer-aided creation of spermiograms. Spermiograms are for determining the fertility of sperms by means of their buoyancy. Haemograms for the general diagnostic investigation and particles in urine can also be analyzed with the described assembly. The assembly and method are further suitable for the monitoring of the stromata opening in plants. Further applications are the processing of water quality, the automatic recognition of phytoplankton and the drinking water analysis. A further embodiment is the automatic detection of protozoa. The use of protozoa as bio-indicators for the assessment of water quality follows from the fact that certain protozoa can be especially sensitive to specific water conditions (for example chemicals). They are held in a chamber in which they can usually survive for longer periods of time. The sample being analyzed is flushed through the chamber. The drinking water quality can be assessed according to the number of surviving protozoa.

Further application fields are the analysis of honey regarding pollen. These enable to draw conclusions on the choice of nectar collected by the bees. Paper can also be analyzed with this device and method. For example, the detection of pressure points with a magnification of about 20× or the detection of contamination, such as rubber, with a magnification of about 200× can be carried out. Further applications are the identification of mushrooms in wood preparation and the detection of sprouting in industrial lubricating oil. In the textile industry, the assembly can be implemented, in particular, in fiber analysis, for example in the procurement of cotton wool on-site. Here, the form of the fiber type or the maturity of the fiber is determined.

Figure 19:
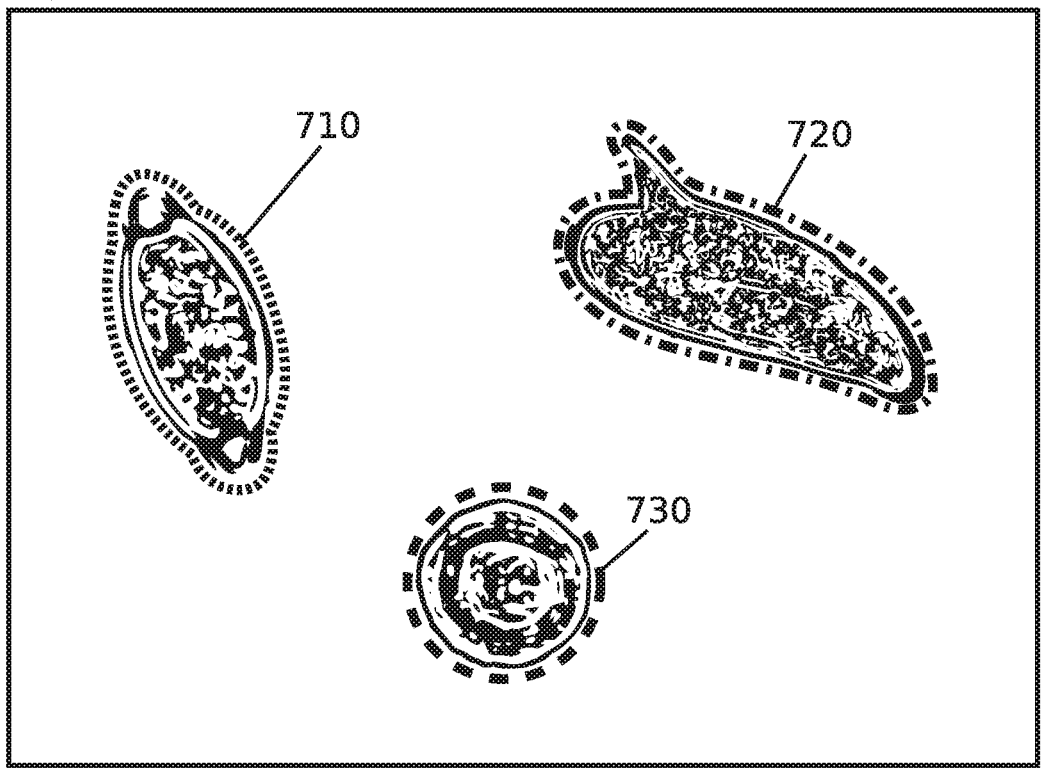
FIG. 19 shows a stool sample of a person with eggs from various parasites, which were recorded with an assembly of FIG. 11.

FIG. 19 shows various parasite eggs which can occur in human faeces in the diagnostics of worm diseases. Different parasite eggs have different forms. These forms can be used for diagnostics of the parasite infestation. It is determined whether eggs are present and what type of eggs they are. FIG. 19 shows eggs 710 originating from *Trichuris trichuiura* (whip worm). 720 *Schistosoma mansoni* (blood fluke) and 730 *Taenia saginata* (beef tapeworm).

Figure 20:
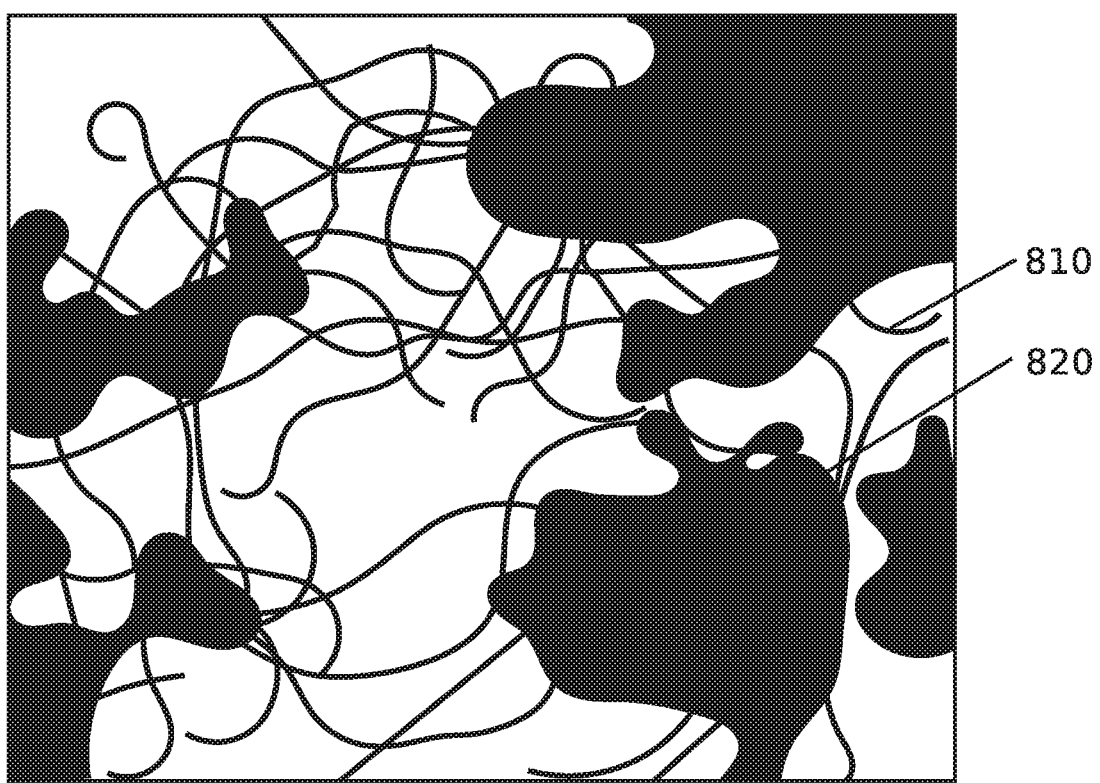
FIG. 20 shows a sample of a sludge flake of the activated sludge from a sewage treatment plant, which was recorded with an assembly of FIG. 11.

A further application is the examination of sewage treatment plants, including activated sludge with automatic species determination and floc and/or flocculation analysis. Furthermore, a determination of the ratio of stringy organisms to sludge flakes can be performed. The "stringiness" is an important parameter in the system operation, since stringy microorganisms are an indication of bulking sludge. FIG. 20 shows a section of a sludge flake of the active sludge of a sewage treatment plant. The flake consists of compact flake parts 820 and stringy algae, or rather, bacteria, which are designated with the numeral 810. When the proportion of stringy organisms is too high, this results in the formation of bulking sludge which no longer settles in the sewage treatment plant. This leads to a worse cleaning efficiency of the sewage treatment plant. By means of the microscopic analysis, it is determined how many stringy organisms are present in one flake. The stringiness index serves as a quality assessment of the sewage treatment plant. Assessing whether counteractive measures must be taken to ensure an optimal operation, is simplified and can take place in a timely manner.

Figure 21:
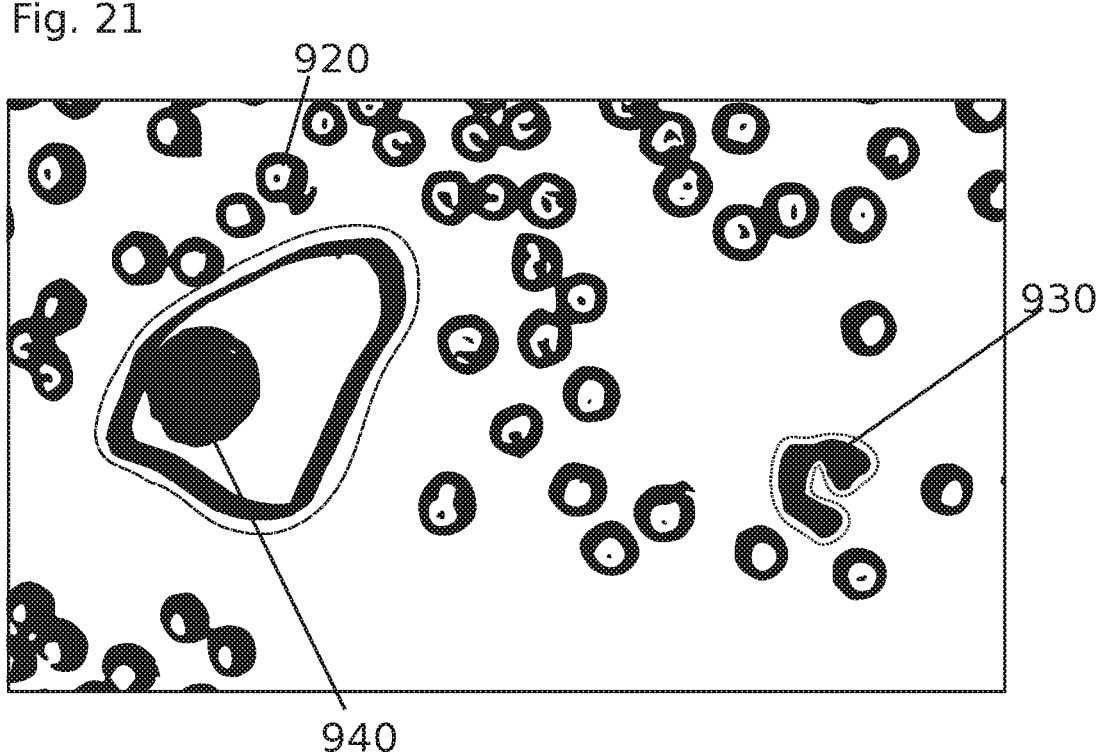
FIG. 21 shows the microscopic image of a swab test from the uterus of a cow using the transmitted light procedure, which was recorded with an assembly of FIG. 11.
Figure 22:
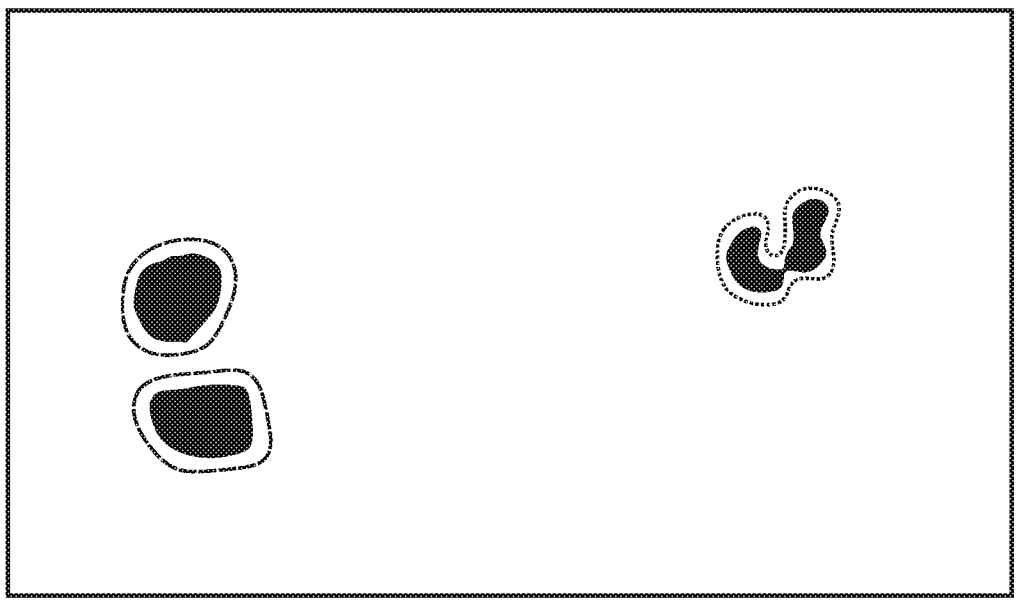
FIG. 22 shows the swab test of FIG. 21 recorded with an assembly of FIG. 12, where a fluorescence die, which specifically binds to DNA, was added to the sample by means of the fluorescence procedure.

A further application is the detection of cells in milk. The number of cells in milk rises when the cows have an udder infection (Mastitis). The analysis of a swab test from the uterus from a cow can also be performed with the described assembly and method. In order to diagnose an inflammation of the uterus, the ratio of leukocytes to mucosal cells is determined by means of the analysis. This is very common with cows and is a crucial factor in regard to whether fertilization can successfully be performed. FIG. 21 shows the microscopic image of a swab test from the uterus of a cow, which was detected in the transmitted light method. The sample was colored by means of a Pappenheim coloring. One can see red blood cells 920, a neutrophilic granulocyte 930 and a mucosal cell 940. The goal of the analysis is to register mucosal cells and neutrophilic granulocytes and to differentiate between them. This is achieved by means of the different morphological characteristics, like, for example, shape and size. The ratio of mucosal cells to neutrophilic granulocytes is determined as the analysis result. This parameter is used for diagnostics of an inflammation of the uterus.

In a different embodiment, coloring is done by means of a fluorescence die which specifically binds to DNA. The image was detected by means of the fluorescence method. The cell nuclei of the mucosal cells and the neutrophilic granulocytes are colored. These can be described, detected and differentiated by morphological characteristics, the same as with FIG. 21.

Figure 23:
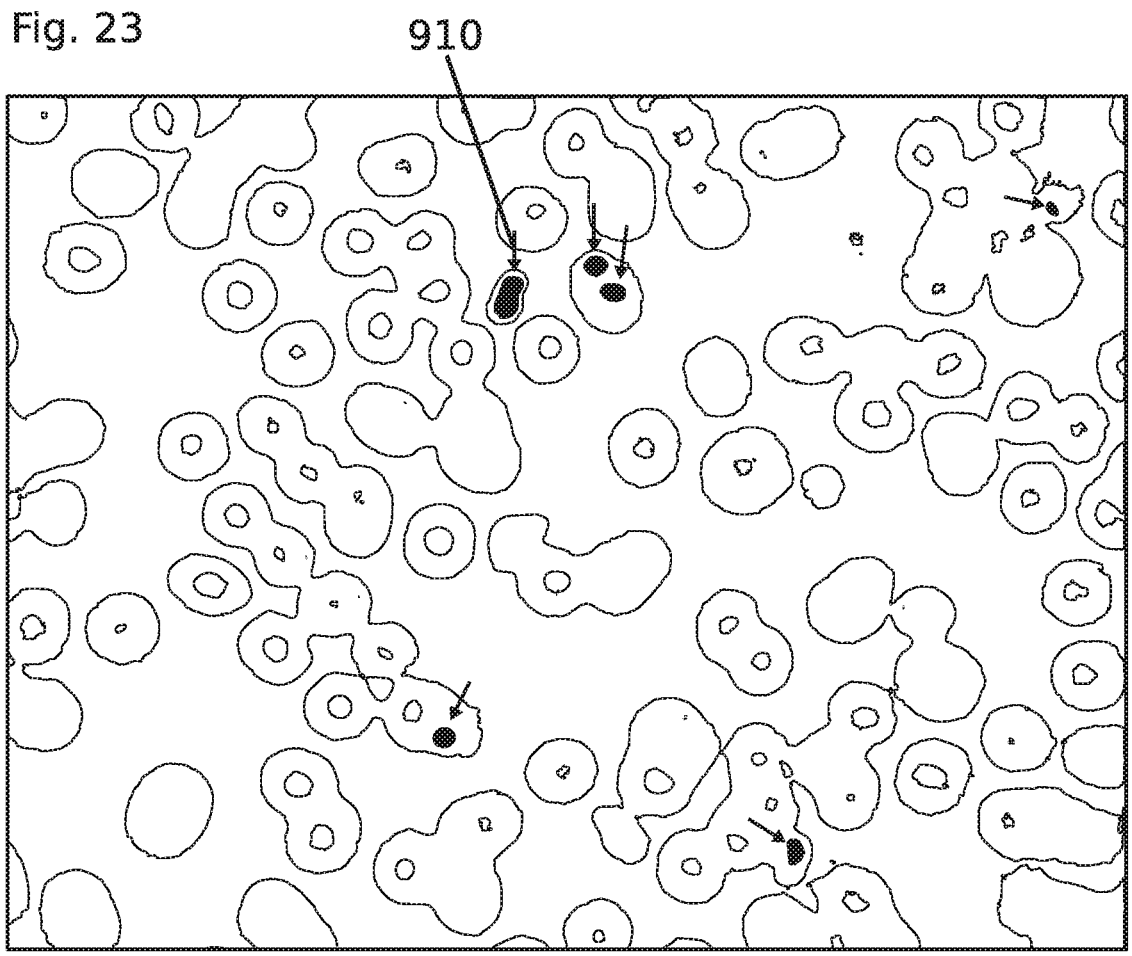
FIG. 23 shows the image of a human blood sample recorded with an assembly of FIG. 11, which was stained by means of a Giemsa staining making malaria pathogens visible.

The assembly and method are also suitable for the diagnosis of diseases, such as leishmaniosis and malaria, among other things. When pathogens are found, then the diagnosis is that the patient is sick. FIG. 23 shows a human blood sample which was colored by means of Giemsa staining. Red blood cells are represented by their edges. Malaria pathogens enter the blood cells and multiply there. Infested blood cells can be shown by means of coloring. They are marked in FIG. 23 with arrows 910. In the course of the analysis, the red blood cells are detected and it can be determined by means of the analysis of the inner coloring, if a disease is present.

With all embodiment and application examples, a complex analysis of the sample is carried out on-site and as soon as possible in a very short period of time, with easy, mobile means. The computing power and expertise is made available by the server and programs on it. Known microscopic analyses can thereby be performed in a significantly cost-reduced way and versatile new applications, which were not yet possible according to the prior art, become available.

The invention claimed is:

1. A microscope assembly, comprising:
a lens assembly for magnified imaging of an object range in an imaging plane along an optical path, wherein the lens assembly has aberrations;
a sample receiving unit for a sample arranged in said object range, wherein said sample is provided on an object plate or in a sample chamber which has a curved profile, wherein said curvature is selected such that said aberrations are at least partially corrected;
a stamp configured to apply pressure to the object plate or the sample chamber outside of the sample to move the sample towards an optical axis into a focus of the lens assembly, the stamp being disposed above the object plate or the sample chamber outside of the sample; and
a camera receiving unit for receiving a camera in a range of said imaging plane said camera adapted to generate a digital image of said sample;
wherein
said lens assembly is a ball lens, a halved ball lens, or a lens in the form of a rotational spheroid; and
said camera receiving unit is adapted to receive a customary mobile end device equipped with a camera or a camera cooperating with a mobile end device, and
wherein said sample receiving unit comprises a bottom part with a flexible and/or deformable material provided thereon, the bottom part with the flexible and/or deformable material being disposed below the object plate or sample chamber outside of the sample and above the camera receiving unit.

2. The assembly of claim 1, wherein said camera receiving unit is slot adapted to receive a smartphone or any other flat mobile end device.

3. The assembly of claim 1, wherein said camera assumes a camera position when inserted in said camera receiving unit and an adjustment apparatus is provided for adjusting said camera position.

4. The assembly of claim 1, wherein said sample receiving unit is a slot or a cavity for the object plate or a sample chamber.

5. The assembly of claim 1, wherein said lens assembly assumes a position and an adjustment apparatus is provided for adjusting said position of said lens assembly.

6. The assembly of claim 1, wherein an apparatus is provided for detecting the presence of the camera and/or the mobile end device.

7. The assembly of claim 1, wherein a coded sample carrier for the sample is provided, and wherein the mobile end device has a device for reading and processing said coding.

8. The assembly of claim 1, wherein said lens assembly comprises a lens which has a maximum diameter of 5 mm.

9. The assembly of claim 8, wherein said lens has a maximum diameter of 2 mm.

10. The assembly of claim 9, wherein said lens has a maximum diameter of 1 mm.

11. The assembly of claim 1, wherein a lens exchanger is provided with multiple lenses with different characteristics, and wherein said multiple lenses are moveable to replace said lens in said optical path.

12. The assembly of claim 1, wherein a further lens assembly is provided in a further optical path, whereby a further portion of said object range is detected.

13. A method for recording and processing an image of a sample forming image content, magnified with a microscope using a lens assembly, wherein said sample is provided on an object plate or in a sample chamber which has a curved profile, the method comprising:
recording the image of the sample, magnified by the microscope, with a digital camera, thereby generating a recorded digital image;
transferring said recorded digital image to a central data processing system with a mobile end device, wherein a plurality of images from various microscopes are processed by said central data processing system; and
storing and processing said recorded digital images in said central data processing system;
wherein
said curvature is selected such that aberrations in the lens assembly of the microscope are at least partially corrected;
said recorded digital image of said sample is magnified with a ball lens, a halved ball lens or a lens in the form of a rotational spheroid and said recorded digital image has ranges with aberrations from said lens;
said digital recorded image is processed with a first program in order to at least partly correct said aberrations;
said corrected digital image is processed with a second program trained by backpropagation in said central data processing system whereby a result obtained from said image content is received; and
said result of said processing is transferred back to said mobile end device.

14. The method of claim 13, wherein said sample or components of said sample have a colour, shape and/or texture and/or further features which are detected for said processing of said digital image, a type and/or strength of said colour, shape and/or texture and/or further features is determined and a classification of said sample or said components is carded out according to said type and strength of the features.

15. The method of claim 13, wherein a result image is generated by said processing and components in said sample are identified and marked in a result image.

16. The method of claim 14, wherein further information is transferred to said central data processing system along with said recorded digital image, which is manually inserted, was saved beforehand or is detected and supplied to said mobile end device with a suitable sensor.

17. The method of claim 14, wherein said result comprises a processed image of said sample.

18. The microscope assembly of claim 1, and wherein said mobile end device has a display and creates an image which can be viewed on said display until an adjustment is sufficiently sharp.

* * * * *